S. K. ZOOK.
MODE OF TELEGRAPHING.
No. 26,140. Patented Nov. 15, 1859.
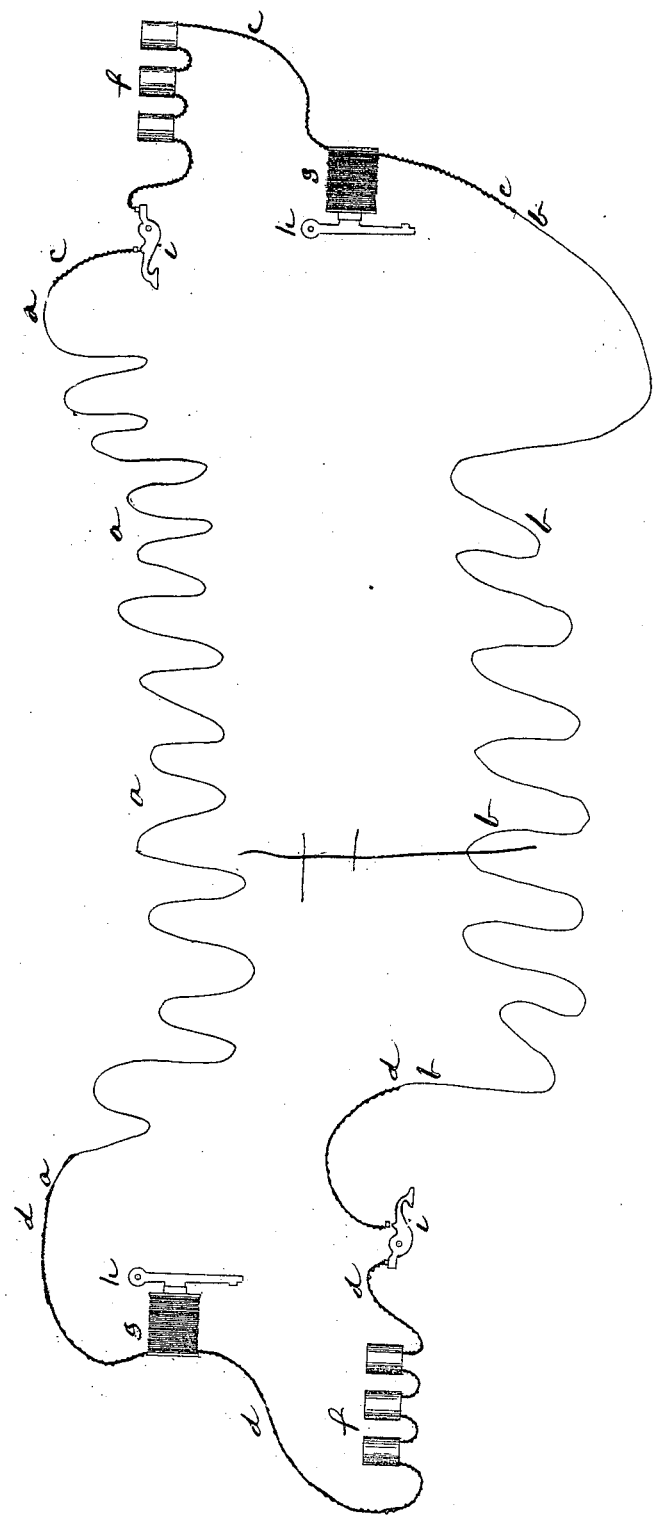

UNITED STATES PATENT OFFICE.

SAMUEL K. ZOOK, OF NEW YORK, N. Y.

IMPROVED MODE OF TELEGRAPHING.

Specification forming part of Letters Patent No. 26,140, dated November 15, 1859.

*To all whom it may concern:*

Be it known that I, SAMUEL K. ZOOK, of the city, county, and State of New York, have invented a new and useful improvement in the manner of constructing and arranging the wire or wires for forming and completing a circuit for electric telegraphing; and I do hereby declare that the following is a full and exact description of my said invention and improvement.

My invention is founded upon the application and use for telegraphic purposes of the principle or law of galvanic or electrical currents that these currents will always follow the line of the highest conducting power, and that when a current has been communicated to a circuit composed of a material having a high conducting power—such, for instance, as a copper wire—the current will continue to follow that conductor to any distance so long as the two ends of the wire are connected with the opposite poles of the battery, and so long as the current does not meet with some other conductor or conducting medium which shall offer a greater facility for the transit of the current back to the battery than the wire itself—in other words, that the current will follow the better conductor through any distance so long as that conductor furnishes a greater facility for its passage than it would find in any shorter distance through materials of an inferior conducting-power.

It is well known that while nearly all substances are in a greater or less degree conductors of electricity, some are vastly better conductors than others. Thus among the inferior conductors of electricity are wood, earth, water, and the like, while the metals are superior conductors, and copper highly so in comparison with most other metals. If, therefore, a copper wire be laid in the earth or water, and forms a circuit between the opposite poles of an electrical battery, a current from the battery will follow the wire through such distance and so long as the current does not find an easier and shorter way of transmission than through the copper wire.

My invention, then, consists in making a practical use of this difference in the conducting power of different substances, in its application to telegraphic purposes by electricity, by combining and uniting artificially-insulated portions of an entire or continuous metallic circuit with unartificially-insulated portions, in such manner that the artificially-insulated portions at the points of junction shall separate the unartificially-insulated or naked portions of the circuit from each other, and so that when the unartificially-insulated portions of the wire or circuit are laid in wood, earth, or water the wood, earth, or water with which the naked portions of the circuit are in contact become insulators by reason of their extremely inferior conducting power, inasmuch as the inferior conductors with which the metal lies in contact oppose a greater resistance to the passage of the electrical current through them than the entire metallic circuit, though the latter may be many hundreds, or even thousands, of miles longer than the distance which the current would travel if it left the wire and formed a circuit through the inferior surrounding conductor at any shorter distance.

In the construction of a telegraphic line or circuit according to my invention the circuit must be of wire throughout. The wire may be laid in the earth, or in the water, or on the bottom of the ocean, and the portions of the wire not contiguous to the battery or batteries are naked and uninsulated artificially, but depend upon the surrounding medium for insulation. The wires must be laid at such distance from each other that the surrounding medium will, between the outward and return lines of wire, furnish sufficient insulation and resistance to prevent the passage or escape of the current across from one wire to the other.

No precise rule as to the distance apart of the two lines of wires is ascertained, but it should be, for example, in a line across the Atlantic ocean between England and America, at least one hundred miles apart; and when the line is entirely in the earth for a distance of five hundred miles ten miles apart is sufficient. When the wires approach the batteries, which may be at any part of the line and as far as the wires on either side are not in contact with the earth or water, the wires must be artificially insulated by a gutta-percha or other suitable covering, so that the circuit of the wire will be uninterrupted.

The accompanying drawing represents a line of telegraphic wire laid according to my invention, the unartificially-insulated or naked portions of the wire being represented as if laid in the ocean at the lines *a a a*, *b b b*, and the artificially-insulated portions, or those not in contact with the earth or water, are represented at the letters *c c c*, *d d d*, these last-mentioned parts being drawn with heavier lines upon the drawing than the other parts.

*f f* represent the batteries; *g g*, the magnets; *h h*, the deflecting needles or indices; *i i*, the keys for opening or closing the circuit.

It is obvious that while this manner of constructing a telegraphic circuit of wire requires a double line of wire, it also dispenses with the necessity of artificial insulation for a great portion of the circuit. In ocean telegraphic lines this will afford a vast saving in the expense of constructing the cable and in laying it at the bottom, and dispenses with a great part of the material and consequent weight of the cable or line.

In the manner of operating and transmitting the signals or currents, the same system is pursued as in other telegraphic lines when the whole circuit is artificially insulated by a non-conducting covering or by non-conducting points of support.

What I claim as my invention in the foregoing, and for which I desire Letters Patent, is—

The construction of telegraphic lines of metallic conductors of a high conducting power, having the portions of the wire conductors which are between the two telegraphic extremes in the earth or submerged in the ocean or rivers not artificially insulated, but using the earth or water as the natural insulator of those parts, in combination with the artificially-insulated portions of the wire on each or either side of the battery or batteries, in the manner and for the purposes described.

S. K. ZOOK.

Witnesses:
 J. B. STAPLES.
 RICHARD WINNE.